(12) United States Patent
Van Luchene

(10) Patent No.: US 7,677,979 B2
(45) Date of Patent: Mar. 16, 2010

(54) METHOD AND SYSTEM FOR ALLOCATING RESOURCES IN A VIDEO GAME

(75) Inventor: Andrew Stephen Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 290 days.

(21) Appl. No.: 11/671,373

(22) Filed: Feb. 5, 2007

(65) Prior Publication Data

US 2007/0129148 A1 Jun. 7, 2007

Related U.S. Application Data

(63) Continuation-in-part of application No. 11/560,456, filed on Nov. 16, 2006, and a continuation-in-part of application No. 11/428,263, filed on Jun. 30, 2006, and a continuation-in-part of application No. 11/380,489, filed on Apr. 27, 2006, and a continuation-in-part of application No. 11/279,991, filed on Apr. 17, 2006, and a continuation-in-part of application No. 11/355,232, filed on Feb. 14, 2006, and application No. 11/671,373, which is a continuation-in-part of application No. 11/670,304, filed on Feb. 1, 2007.

(60) Provisional application No. 60/727,121, filed on Oct. 14, 2005.

(51) Int. Cl.
*G06F 17/00* (2006.01)

(52) U.S. Cl. ........................................... 463/42

(58) Field of Classification Search ................... 463/16, 463/20, 25, 40–42; 705/1
See application file for complete search history.

(56) References Cited

U.S. PATENT DOCUMENTS

| | | | | |
|---|---|---|---|---|
| 5,885,156 A | * | 3/1999 | Toyohara et al. | 463/1 |
| 6,141,653 A | | 10/2000 | Conklin et al. | |
| 6,227,966 B1 | * | 5/2001 | Yokoi | 463/1 |
| 6,447,396 B1 | * | 9/2002 | Galyean et al. | 463/40 |
| 6,656,050 B2 | | 12/2003 | Busch et al. | |
| 6,951,516 B1 | * | 10/2005 | Eguchi et al. | 463/40 |
| 7,470,190 B2 | * | 12/2008 | Baerlocher et al. | 463/25 |
| 2004/0266505 A1 | | 12/2004 | Keam et al. | |
| 2007/0087797 A1 | * | 4/2007 | Van Luchene | 463/1 |
| 2007/0087799 A1 | * | 4/2007 | Van Luchene | 463/1 |
| 2007/0111770 A1 | * | 5/2007 | Van Luchene | 463/7 |
| 2007/0191104 A1 | * | 8/2007 | Van Luchene | 463/42 |
| 2008/0004120 A1 | * | 1/2008 | Van Luchene et al. | 463/42 |

OTHER PUBLICATIONS

Kelly, J.N. "Play Time: MMORPG Play as an Economic Activity" Dec. 12, 2004.
Star Wars Galaxies Released Jun. 26, 2003, as described in Wikipedia.

* cited by examiner

*Primary Examiner*—Ronald Laneau

(57) ABSTRACT

The present disclosure provides various novel concepts to a video game environment. The disclosure describes video game environments that include a method and system for controlling the quantity and distribution of virtual natural resources, raw materials, skills and NPCs in and between games, where player characters may acquire, use and modify such virtual resources within the physical limits of the games.

16 Claims, 5 Drawing Sheets

METHOD AND SYSTEM FOR ALLOCATING RESOURCES IN A VIDEO GAME

PRIORITY CLAIM

The following application is a continuation-in-part of U.S. patent application Ser. No. 11/670,340 entitled "Method and System for Allocating Resources in a Video Game," filed Feb. 1, 2007, Ser. No. 11/560,456 entitled "Exchanges in a Virtual Environment" filed Nov. 16, 2006, Ser. Nos. 11/380,489, 11/428,263 entitled "Video Game Environment" filed Jun. 30, 2006, entitled "Multiple Purchase Options for Virtual Purchases" filed Apr. 27, 2006, Ser. No. 11/279,991, entitled "Securing Virtual Contracts with Credit," filed Apr. 17, 2006, and Ser. No. 11/355,232, "Online Game Environment that Facilitates Binding Contracts between Players," filed Feb. 14, 2006, all of which claim the benefit of U.S. Provisional Patent Application Ser. No. 60/727,121, entitled "Method and Apparatus for Facilitating Player to Player Contracts in a Massive Multiplayer Online Video Game," filed Oct. 14, 2005.

BACKGROUND

Video games which are accessible to multiple players via a server or peer to peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

DETAILED DESCRIPTION

Figure 1:
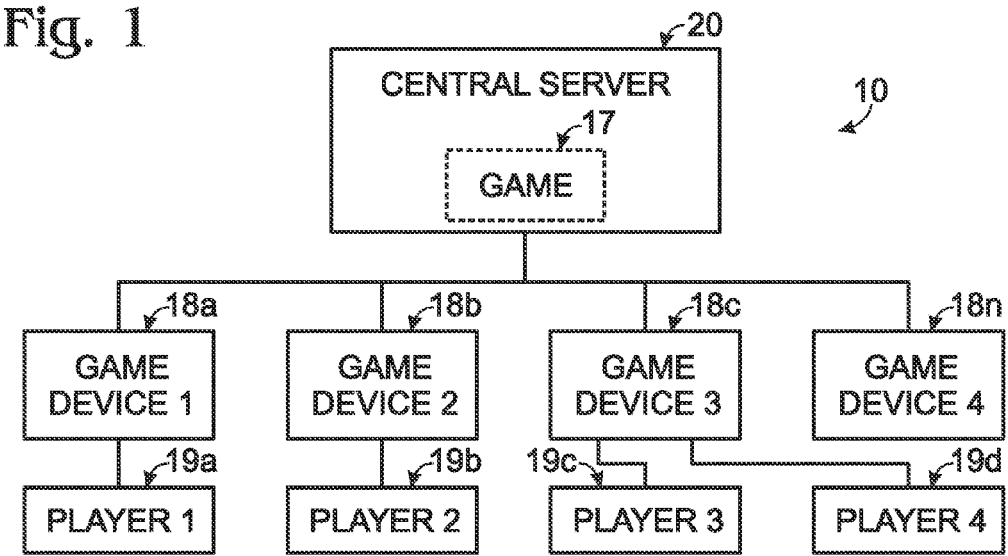
FIG. 1 is a block diagram depicting a network according to an embodiment of the present disclosure.

Definitions:

Unless stated to the contrary, for the purposes of the present disclosure, the following terms shall have the following definitions:

Alert—includes the transfer or storage of information or otherwise communicating with, by, between or among any two or more of the following, including, but not limited to any real or virtual: a) players, b) game owners, c) game or other servers, d) player characters, e) NPC's, f) exchanges, g) game devices or controllers, h) cell phone or other communications hardware and/or networks, i) databases, j) software applications, k) legal agencies, l) governing bodies, m) software interfaces, n) and/or any combination of any of the above, which may be initiated by and/or based upon an alert event or other action.

Alert Event—includes any change in, of or to any condition or state, and includes any action or failure to act, and thus Alert Event includes, but is not limited to:

1. When or after any one or more variables or data changes or is expected or is about to change within a game application or one or more databases, e.g., a balance is reached or exceeded.
2. When or after information is transmitted and/or shared (eg via a communications package or other mechanism) between two or more applications, game services, servers, financial institutions, or any other entities, e.g., a message sent between two servers to settle a debt or payment.
3. When or after a step or procedure (e.g., of software, a script, a user-defined process) is executed, e.g. when a penalty or interest amount is charged to an account, or an action is taken by or within a game.
4. When or after an application or service (e.g., a software service) is started, paused, stopped, proceeds to a certain point, or is changed.
5. When or after an item becomes or may become available for use or sale by an NPC or Player Character and/or at any given point during construction of the item, e.g., at a construction milestone.
6. When or after a character has reached or may reach a certain level or has started and/or completed a certain mission or an objective within a mission.
7. When or after a player has obtained or may obtain a certain attribute or resource.
8. When or after a player is logged into or out of the game or another participating game, e.g., when a friend logs into a particular game.
9. When or after a character or NPC has been created, harmed, killed or destroyed in a game, and/or some other action is taken by or otherwise affects a player or player character.
10. When or after a player's account or any attribute of any player character is or and/or any of his financial data or other information that may be changed, added to or removed, lost or damaged.
11. When or after a price, fee, tax, or other financial amount changes (e.g., increases or decreases or is established or eliminated, or is expected, calculated or projected to change).
12. A trend changes, e.g., a particular rate of spending increases or decreases.
13. A battle or wager is started, won or lost, or an interim objective is achieved or is not achieved.

14. An object or service is made available for sale or the price changes or is about to change.
15. A marketing offer is generated or presented.
16. A player joins or retires from a game.
17. A player completes a task, level, challenge, duty, service, mission, etc.
18. A new game or version of an existing game is brought online or is available for play.
19. A game is turned off for servicing or is no longer available for play (temporarily or permanently, to some, certain or all players).
20. A tax amount or rate is created, changed, deleted, reached, falls below or increased or decreased by an amount or percentage or may soon change or is expected to change.
21. An item or object is identified, stolen, found, created, bought, sold, encumbered, used, deployed, returned, compromised, modified or destroyed.
22. One more players and/or servers and/or applications wishes, determines or requests to notify another one or more players and/or servers and/or applications via an alert message or messages.
23. When a player is logged in to a system (e.g., the virtual world, an external instant messenger system).
24. When a date and/or time approaches, is reached or is past.
25. When a virtual auction starts or is ending or has ended.
26. When an item within a virtual auction comes up for bid or has been sold.
27. When payment is made or is or will become due for a virtual purchase or on any loan and/or when one or more payments are missed, or a payment type.
28. When a loan penalty or interest is applied.
29. When or after a reward or point is assigned to a financial account or when or after a certain threshold is reached, e.g., when a player accrues sufficient points to purchase a desired item.
30. When a player opens, closes or applies for a loan and/or makes a payment on a loan.
31. When or after one or more player characters, NPC's or any other real or virtual person or item moves from one position to another, or from one position to a specific position, or uses one path vs. an expected or required path, or deviates from one path to another path, or proceeds faster or slower than required or expected.
32. And/or any one or more or any combination of any of the above, which are collectively referred to as an "alert event".

Credit Card—a credit instrument issued by a real or virtual world institution to a player that allows the player to make purchases by providing an account identifier (e.g. a credit card number) rather than cash or other currency. An example is a credit card like those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Game Objective or Game Goal—means a desired state, condition, result, action, cessation of action, or a desired outcome and/or change or a delay in change to any of the preceding.

Virtual credit card—a financial instrument issued in a virtual environment that acts in the virtual environment for virtual currency the way a real world credit card acts in the real world for real currency.

Real Cash Value—the value in real dollars of the virtual currency. This value can be determined by multiplying the value of a virtual currency amount by the current exchange rate to real dollars.

Total virtual obligation amount—the total amount of the virtual financial obligation(s) associated with a player character's account.

Virtual Contract—An enforceable agreement between a first player character and either another player character, a game server, or a third party. Some examples of virtual contracts are provided in U.S. Provisional Patent Application Ser. No. 60/652,036, which is hereby incorporated by reference in its entirety for all purposes.

Virtual—shall mean in a video game environment or other intangible space.

Virtual World—a world created in an online game such as World of Warcraft, or a virtual community such as Second Life, Eve or There.com.

Virtual Creditor—shall mean a first player character or other entity who is owed a virtual obligation by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—An agreement by a player character or entity to pay one or more game attributes to another player character, entity or game server. This obligation can be a one time payment, or multiple payment over time. The obligation can specify that payments are due on virtual or real dates.

Virtual Financial Intermediary—Financial intermediaries are institutions including depository institutions, contractual savings institutions, and investment intermediaries which offer financial products and services for use within the virtual environment. The various financial intermediaries available in the virtual environment may each serve different or overlapping purposes and provide means for using, saving, borrowing and transferring currency.

Virtual Financial Obligation Value—the in game value of the obligation. For virtual cash the value may be stated as a virtual and/or real cash amount. For other game attributes, the value can be determined by generating a virtual cash market value for the item based on the current value in an online marketplace or exchange. The value of the obligation may be fixed or variable and may also be set as a condition of the player contract and/or by the game server or other entity.

Billing Information—shall mean any information pertaining to billing a player for playing a game, accessing a game, purchasing goods or services, or any other reasons. Billing information may include such real world information as a billing address, credit card account number, bank account number, pay pal account number or other payment facilitator, or the account number of any other financial entity providing a real world credit line or any other payment-related information.

Character or "player character"—a persona created and controlled by a player in a video game.

Avatar—the virtual representation of a player character.

Character Account—an account that tracks character attributes.

Character Attribute—any quality, trait, feature or characteristic a particular Character can have that is stored in the corresponding Character Account. Character Attributes may include, but are not be limited to:
1. A character score
2. A virtual object
3. The physical appearance of a character
4. An emblem or mark
5. A synthetic voice
6. Virtual currency
7. Virtual help points or credits
8. The ability to join groups of other players at a later time
9. A score for subsequent matching of later game parameters
10. A relationship with another character
11. A genetic profile or makeup
12. A skill or skill level
13. A ranking Character Life—a fixed or variable, finite or infinite period of virtual or real world time that a player character can exist in a game environment.

Character Skills—game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

Computer Generated (CGC) or Non-Player (NPC) Character—any character that is controlled by the game system and/or a computer program and/or rules established by the game system and/or a player and not by a player on a continuous basis.

Game performance parameter—any aspect of a Video Game by which a player character's performance can be measured. Game Parameters shall include, but not be limited to:
1. Completing all or part of a mission
2. Playing for a certain period of time
3. Winning a match against another player character or computer generated character
4. Reaching a certain level or score
5. using or obtaining an ability or technology
6. kill/death ratios
7. obtaining, creating or modifying an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials
18. producing goods or services
19. earning income
20. earning a higher rank in an army
21. winning an election among two or more player characters
22. achieving deity or other status
23. improving player character status or caste
24. assisting other player characters with any of the above
25. speed of accomplishing or changing the rate or trends of any or all of the above.

In-game Marketplace—shall mean a virtual environment where Characters can exchange items, attributes, or any other exchangeable game element.

Novice Player—shall mean a player that is identified as requiring the help of an expert to complete a Game Parameter.

Player—shall mean an individual who can register an account with a Video Game Central Server or within a peer-to-peer network and create Characters that can interact with other Characters in a Virtual Environment, and/or that can authorize a NPC to act on the player's behalf.

Player Account—shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:
1. Real Currency.
2. Discount of monthly fees for playing game.
3. Monthly fee for playing a game.
4. Interest rates for use of or borrowing real or virtual cash amounts.
5. Global character attribute settings for all characters created by player across multiple games.
6. Rewards for encouraging another player to signup to play.

Player to Player Contract—a real and/or virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—a game played on a Video Game Consul that may or may not be networked to a Video Game Central Server or within a peer-to-peer network.

Video Game Consul—a device comprising a CPU, memory and optional permanent storage residing at a player location that can allow for the playing of video games. Examples include, home PCs, Microsoft Xbox, and Sony Playstation.

Video Game Central Server—a CPU, memory and permanent or temporary storage that is connected to multiple Video Game Consuls that allows for Massive Multi Player Online Video Games to be played.

"Game Environment"—a particular level or area within a virtual world. Each game environment may have its own rules, regulation, currency, government, managers, etc. Game environments may exist within other game environments.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The terms "represent" and "represents" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and "such as" and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

DESCRIPTION

Massive multi player online games (MMOGs) or massive multi-player role-playing games (MMORPGs) are computer games which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The choice of the use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

While virtual games as previously described may provide an environment for gaming, the degree of interaction with the environment of the game may be limited. For example, in most games, the type of environments that exist in a virtual game and the items available in such environments may be primarily determined by the game server. Such environments are frequently static or contain a limited amount of predetermined pre-formed objects whose aspect cannot be altered or which can only be assembled in predetermined ways. Additionally, the distribution of resources in most games is controlled completely by the game server and limited to a single game or game environment, stifling the development of the game and limiting the ingenuity of the gamers.

Various embodiments of the present invention address this issue by providing a system of distribution of virtual natural resources, raw materials, skills and NPCs and means of allocating and acquiring such virtual resources to be used within a virtual environment. Such virtual resources may be improved upon, altered, or developed into other game attributes depending on aspects of gameplay. They may also be traded or exchanged between game environments and between game environments in different games improving the depth of the interactions of each game. For ease of description, virtual natural resources, raw materials, skills and NPCs may collectively be referred to as virtual resources throughout the application.

Game environments are particular levels or areas within a virtual environment. There may be game environments within game environments, game environments with varying degrees of dependence, game environments with varying degrees of connectivity, or each game environment may stand alone.

Game environments may be formed in a variety of ways. In one embodiment, a set number of game environments may be created at the formation of the game. In another embodiment, the number of game environments in a game may be variable. For example, the number of game environments may be based on population increases or decreases, wealth, missions accomplished, the number of registered players, the number of characters playing, the market value of all game environments, the projected growth of the game or existing game environments, on recurring events, randomly, based on requests by players or characters, or according to any other criteria as determined by the game. In some embodiments, the number of game environments may be fixed or variable at different points during the game.

Game environments may be controlled in whole or in part by the game server, game owner, manufacturer, one or more players, one or more characters, corporations, third parties, or a combination thereof. In one embodiment, there may be a game environment manager who administers a game environment. The game environment manager may be a character, player, group of characters, group of players, NPC, group of NPCs, committee, company, religion, government, or any combination thereof. Other game environments may be run by entities such as corporations or by a single character. For example, in one embodiment, a character may become, for example, a god of the game environment. In another embodiment, a governing body may be elected which can make decisions regarding the game environment. In a further embodiment, a group or single entity may be appointed to make decisions regarding the game environment.

In some embodiments, game environments may be acquired by participants in the game. Game environments may be acquired by any means deemed appropriate by the parameters of the game. In one embodiment, the game server screens characters to determine eligibility for creating game environments using some or all of the following method steps:

1. Retrieve a player resume.
2. Determine if resume qualifies to create a game environment based on qualification rules and conditions.
3. Flag resume as qualifying and output notice to player character that he is eligible to create and manage a game environment.

Eligibility to create a game environment may be based on any qualifications determined by the parameters of the game, the game server, the owners of the local game environment, or any combination thereof. In one embodiment, eligibility may be acquired when a character reaches a certain skill or wealth level. In another embodiment, game environments may be purchased. In a further embodiment, game environments may be granted to players and/or characters who discover them. In another embodiment, game environments may be won, purchased, awarded, or acquired by player(s), character(s), NPCs, or other entities. In a further embodiment, game environments may be randomly distributed. In still another embodiment, characters or players may apply to form game environments.

The type of game environment formed or the conditions of the game environment upon formation may depend on gameplay, requested parameters, the type of missions completed, wealth accumulation, population, or any other criteria determined by the game. In some embodiments, game environments may be formed as empty space. In one embodiment, a game environment may be subdivided into particular jurisdictions. In other embodiments, game environments may be created with a certain amount of available virtual resources or access to a pool of virtual resources from which specific resources may be selected for that game environment. The available virtual resources or the pool of virtual resources may be predetermined wherein every game environment starts with the same amount of virtual resources, the same type or virtual resources, the same value of virtual resources, or the availability and types of virtual resources available for selection or distribution may depend on any relevant criteria including, but not limited to, randomly; as determined by the game sever or other game parameters; as determined by the game owner; as determined by the game environment owner; according to an evaluation of the game environment owner character(s) or player(s) such as, the amount of wealth the player(s) and/or character(s) has accumulated, the amount of time the character(s) has been in existence or the player(s) behind the character(s) has played the game, assessments of the skill level of the character(s); the population of the game environment; the pace of gameplay; the relative price of virtual objects constructed from virtual resources; the relative demand for such virtual resources; the choices of the game environment owners or managers; the choices of other game environment owners or managers; any other criteria relevant for assigning virtual resources, or a combination of the above. In one embodiment, the availability of virtual resources may be based on the results from a previous game or games, e.g., certain attributes, settings, prices, etc., may be determined in whole or in part, or "inherited" from a previous game, game era, segment, or any other related or unrelated game(s).

In another embodiment, virtual resources may be purchased from other games, other game environments, or the game server for allocation within the game environment using real or virtual currency, assets, credit, loans or other financial instruments. Such methods of exchanges and payment are further described in detail in U.S. patent application Ser. No. 11380,489, filed Apr. 17, 2006, Ser. No. 11/559,158, filed Nov. 15, 2006, and Ser. No. 11,560,456 filed Nov. 16, 2006, each of which is herein incorporated by reference in its entirety.

In yet another embodiment, the game server, game owner, game environment owner or other governing entity may add virtual resources that were not originally part of the game environment or remove virtual resources that were originally part of the game or added thereafter. In still another embodiment, real resources may be converted into virtual resources. In some embodiments, virtual resources may be tagged with a unique identifier to ensure that they are not being illegally replicated. In other embodiments, anything made with a virtual resource may be tagged with a unique identifier that identifies the source of the virtual resources used to create the virtual object.

In a further embodiment, there may be a master server that may control a finite set of virtual resources for all participating sub-servers. This server controls some or all of the virtual resources available to some or all of the other sub-servers at a global level, thus permitting games to focus on their versions, plot lines, characters and other unique variables, while the master server controls all the legal and structural matters. The master server may permit transactions between sub-servers allowing for variable arrangements of virtual resources without compromising the integrity of the game.

The amount of virtual resources available may be fixed or variable, finite or infinite. In one embodiment, there may be a fixed amount of virtual resources available for allocation at the time of commencement of the game, regardless of the growth of the game or the number of game environments that develop within a game. In another embodiment, there may be a set amount of virtual resources that are available for allocation for each game environment that forms. In an additional embodiment, there may be a set amount of virtual resources that are available for each type of game environment that forms. For example, virtual cities may receive a different amount of virtual resources than countries; virtual islands may receive a different amount of virtual resources than continents. In a further embodiment, there may be a set value of virtual resources available when or at some point after each game environment forms. In still another embodiment, there may be a set amount or value of virtual resources available at a particular level, within a particular era, or at any other determined point within the game. In a further embodiment, there may be additional virtual resources which are made available when existing virtual resources are partially or completely depleted. In yet another embodiment, the amount of virtual resources or the value of the virtual resources available may depend on market rates; a rate setting agency; the choices made at the time of formation of other game environments, choices made by other players; character wealth; the size or type of game environment; the discretion of the game manufacturer, game server, genetic algorithm or other managing entity; or any combination thereof.

During game play, inequities may develop in the distribution and acquisition of virtual resources. In some embodiments, such inequities within the gaming environment may be addressed through alterations in virtual resource distribution. For example, in one embodiment, the amount of a virtual resource available to be allocated may be altered by the game manufacturer, game server, genetic algorithm or other managing entity. In another embodiment, if the lack of a certain virtual resource is determined to unfairly benefit one player or group of players over another player or group of players, then additional virtual resources may be made available according to criteria determined by the managing entity. Such virtual resources may be made available to all players on an equal or unequal basis, only to those at the disadvantage, to new players or new game environments, distributed randomly, distributed to some characters, to all characters or any combination thereof. In some embodiments, the additional virtual resources may or may not bring the disadvantaged players into parity. For example, some game environments may favor certain types of characters, i.e. mines favor dwarves; in order to ensure that dwarves do not have an unfair advantage, other characters may be given lanterns, or the ability to see in the dark, the ability to see in the dark under certain conditions, an enhanced sense of touch, feeling, hearing etc. In one embodiment, the virtual resources given to the other players may only work a certain number of times, for a certain length of time, when a particular mission is completed, if a particular item is found, continuously, or any combination thereof. In a further embodiment, if a virtual resource is depleted, it may be redistributed to all characters currently in that environment so that no one character has a significant advantage. In one embodiment, characters or types of characters may be prevented from becoming too powerful in that once a certain level is attained it becomes more difficult for that character to obtain virtual resources, or that character's virtual resources expire faster, or more virtual resources are required to accomplish specific tasks. In another embodiment, a fraction of the virtual resources obtained by the powerful character at a particular point may be reallocated to other characters, may be reacquired by the game or game environment through taxes or other duties, or any combination thereof. In a further embodiment, new players or characters may be given assistance, for example they may receive extra virtual resources, or it may be easier for them to obtain virtual resources until they reach a particular skill level. In one embodiment, a player may receive a virtual resource and then elect which of his characters will receive the virtual resource and how much, if any they will each receive. In another embodiment, the controlling entity of the game environment may allocate the same number of virtual resources to all characters when they enter the game environment. Such an allocation may be made each time they enter the environment, or the first time they enter the environment, or some combination thereof. In another embodiment, the same percentage of virtual resources may always be available. For example, the same percentage of virtual resources may be available to new players, new game environments, new clans, in different era, or the like. Alternatively, or additionally, when a virtual resource is used up, lost, traded or otherwise removed in one environment the virtual resource may be replenished so that the total percentage of available virtual resource in the environment does not change. In another embodiment, when a virtual resource is depleted, it may revert back to the control of the game or may be otherwise recycled so that the same or other amount of a given virtual resource is generally available within the game or game environment though the allocation may change.

Virtual resources may be distributed or available for selection for distribution at the beginning of a game; at the beginning, end or other point of time within a turn; when a game environment is formed or modified; at the beginning of a specific timepoint in a game such as at the beginning of an era;

periodically throughout the existence of a game environment or the game; when a certain number of players have entered a game environment; when a certain number of players leave a game environment; when one or more player characters have discovered, created, purchased or otherwise obtained a skill or attribute; when the virtual wealth or output (e.g. gross domestic or game product) of a game environment reaches, falls below, or exceeds a certain threshold and/or rate of change; when a certain number of virtual loans have been issued to player characters or virtual entities in a game environment; when it is determined that such virtual resources are needed or desired by a game objective; when a goal is achieved, at prescribed times; when a new feature or function is added to the game or the game environment; when a new item or attribute has been received from another game or game environment; when particular technological or developmental milestones are reached; or in any combination thereof.

Once the amount of virtual resources in a game environment is determined, the virtual resources may be allocated within that environment. The selection and placement of virtual resources in a game environment may be based on the decision of the game server, the server owner, a player or group of players, a character or group of characters, or based on any learning algorithms designed for such purpose which may seek to optimize play, may be automatic depending on the type of virtual resource, may be based on a particular trigger, one or more genetic algorithms or any combination of the above. In one embodiment, virtual resources may be allocated by jurisdiction; in another embodiment, each area of a game environment may receive a similar allocation of virtual resources. In a further embodiment, different areas or jurisdictions of a game environment may receive different virtual resources. Allocation may or may not follow any known physical laws. For example, in one embodiment, mineral deposits may only or may always be found in mountains. In another embodiment, placement of mineral deposits may be unrelated to geological features, for example, the placement of mineral deposits may be random, directed by an entity related or unrelated to the game, or based on other game features or factors.

The allocation of virtual resources within a game environment may be fixed once established, may be variable, may be fixed and variable or may be fixed or variable depending on the time point or other criteria in the game. For example, virtual resources may be distributed through a game environment during certain time periods or eras in a game and may be reallocated or different virtual resources may be selected and allocated at the start of the next time period or era.

The renewability of some of the virtual resources may be determined by the game environment managing entity, the game server, game owner, server owner, a character, a player, a group of characters or group of players, chance, one or more genetic algorithms, or any combination thereof. For example, certain virtual resources may be renewable at certain times, such as agricultural resources which may have growing seasons. In another embodiment, virtual resources are available until they are depleted or nearly depleted or at some other pre- or otherwise determined point during their depletion. In a further embodiment, the types of virtual resources available may depend on the level or era of the game. For example, radioactive materials may only be available when a character has acquired the skills to handle such materials. Virtual resources may be renewable or non-renewable according to the renewability or non-renewability of that virtual resource in the real world, or may be governed by a different set of physical laws. For example, fish are generally considered a renewable resource unless an area is over fished. In the virtual environment, fish may be a renewable resource, or there may be a set number of virtual fish available, or the number of fish may depend upon "natural selection" or available food or rates of reproduction of fish. Minerals such as types of ores are generally considered to be non-renewable in the real world. In the virtual environment, virtual mineral deposits may replenish themselves once they reach a certain level. In another embodiment, they may be replenished by one or more players or characters, for example, by paying a fee, achieving a goal, learning or acquiring a skill, a potion, a spell, or any combination thereof. There may be additional factors which influence renewability or non-renewability of a resource including, but not limited to, weather, natural disasters, the demand for the resource, growth of the game environment, wealth of the game environment, population, overuse, underutilization, or any combination thereof.

Virtual resources or parts of virtual resources may also be recycled. For example, if a character dies or stops playing, the character's various acquisitions including virtual natural resources, raw materials, assets, NPCs, and skills may be available, in whole or in part for redistribution within the parameters of the game or may simply disappear. In another embodiment, some objects may have a natural rate of decay, for example food stuffs may have an expiry date. When that expiry date is reached, the food stuffs may become available somewhere else or available for redistribution within the game. Skills may have continuation requirements, or "use it or lose it" provisions so that if the skill is not used within a certain amount of time, or additional training is not pursued, a character may lose all or part of a skill. In one embodiment, such a skill may then become available elsewhere in the game. Objects may also be disassembled and their component parts used to build other objects.

Figure 2:
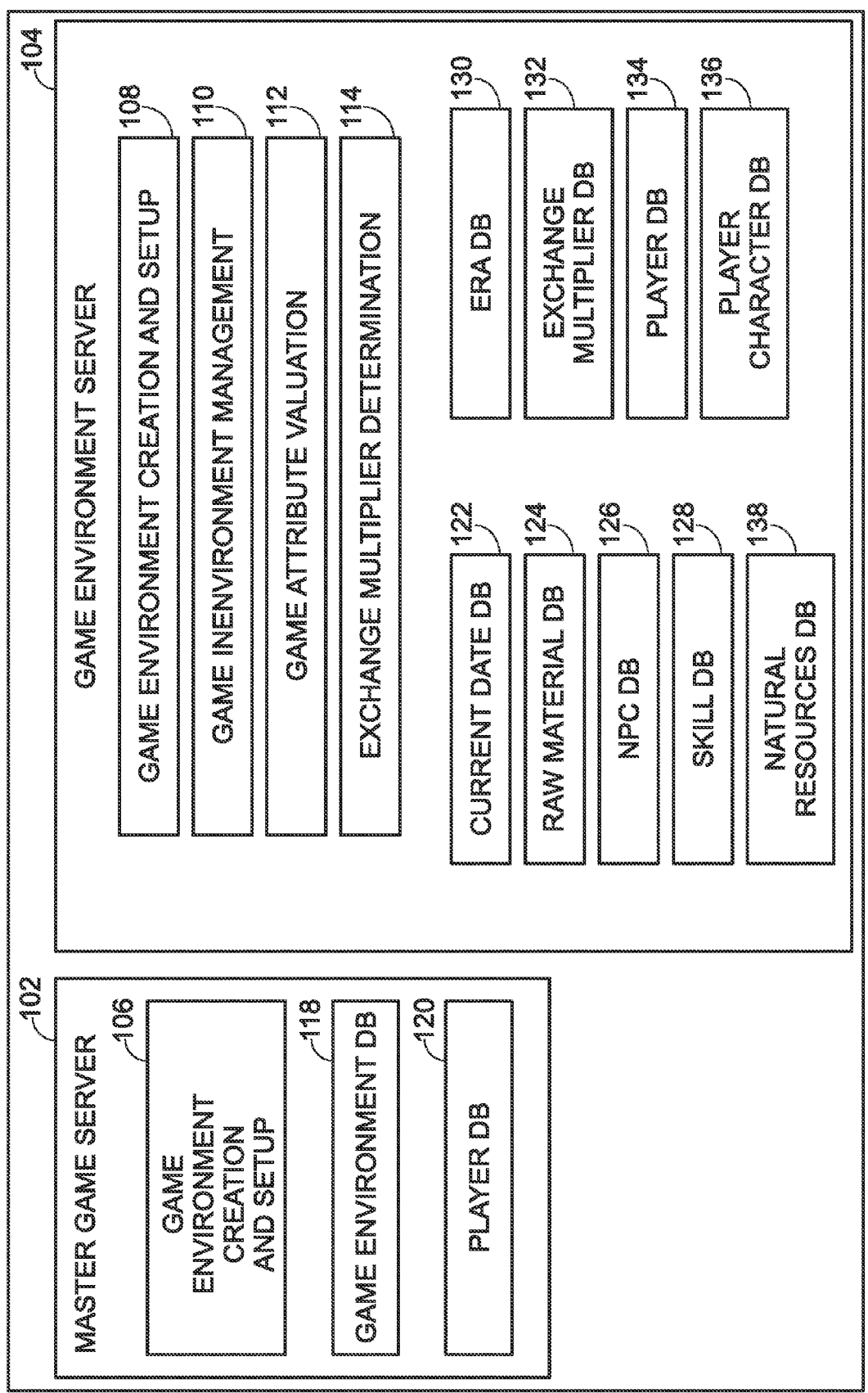
FIG. 2 is a block diagram depicting a system 100 according to an embodiment of the invention.

Game environments and virtual resource availability and allocation may be created and run by any means applicable. In one embodiment, an exemplary system 100 is configured to provide the virtual environment described above. As shown in FIG. 2, system 100 includes a master game server 102 and a game environment server 104 for one or more game environments within the game.

Master game server 102 may host a program such as game environment creation and set up program 106. Master game server 102 may further host a plurality of databases including, for example, game environment database 118 and player database 120. Game environment server 104 may host a plurality of programs including, for example, game environment creation and set up program 108, game environment management program 110, game attribute valuation program 112, and exchange multiplier determination program 114.

Game Environment server 104 may include a plurality of databases including, for example, current date database 122, raw material database 124, NPC database 126, skill database 128, era database 130, exchange multiplier database 132, player database 134, player character database 136, and natural resources database 138.

In one embodiment, game environment database 118 may store information regarding the game environment such as the game environment ID, identification of the owners, percentage ownership, configurations, managers, governance structure, natural resources, raw materials, creation date, fee structure, or any other information relating to the game environment. Player database 120 may include information regarding the players in a virtual environment, their ID(s), the character(s) they control, billing information and the game environments in which the players have characters.

Natural resources are naturally occurring substances that are considered valuable in their relatively unmodified (natural) form. They are generally classified as renewable or nonrenewable. In the real world, the rate of sustainable use of a renewable resource is determined by the replacement rate and amount of standing stock of that particular resource. In the virtual world, the rate of sustainable use may be determined by the replacement rate and amount of standing stock or may be determined by other factors. For example, some virtual resources may be automatically renewable when they reach a particular depletion level. In another embodiment, virtual resources that are generally considered nonrenewable may be renewable in the virtual world. Information regarding virtual natural resources may be stored, for example, in Natural Resources Database 138 and may include information such as, but not limited to: resource ID, resource descriptor, last market value, maximum allowed, issued to date, remaining to be issued, permit price, available date range, resource attributes 1-n, renewability, perishability, decay rate and level in which it exists.

Raw materials may include crude or processed material that can be converted by manufacture, processing, or combination into a new and useful product. In one embodiment, raw materials include semi-processed materials such as building supplies or food. Conditions for the existence of raw material may be established when the game environment is formed, or may evolve or be reassigned as the game environment develops. In one embodiment, raw material database 124 may include, for example, raw material ID, raw material type, location, first date available, conditions for use, conditions for discovery, conditions for availability, max quantity allowed, quantity issued, quantity remaining, license or permit fee, expiration date, natural decay rate/perishability factor, and available times during the game.

NPCs may aid in the acquisition or creation of virtual resources. For example they may be used to harvest, or mine virtual resources, and/or to construct or modify objects. In some embodiments, NPCs may have a predetermined skill set. In other embodiments, NPCs must be taught or given skills and/or given or shown an example to follow. The capabilities of the NPCs may be stored by any means available, for example in NPC database 126. NPC database 126 may include information such as, but not limited to, NPC ID, type, skill set, training level, location, availability, maximum quantity allowed, quantity issued, quantity remaining, license or permit fee, available eras, etc.

The skills to acquire and use the natural resources and raw materials may be stored by any means applicable, for example in Skill database 128. Skill database 128 may include information such as, but not limited to, skill ID, type, conditions for use, conditions for availability, maximum quantity allowed, quantity issued, quantity remaining, license or permit fee, and available eras.

Once virtual resources are acquired, characters may use them to construct other objects, may trade or sell them, may use them, may consume them, may use them to acquire wealth or in any other manner they desire. In one embodiment, virtual natural resources and raw materials may be assembled into other game items using particular skills or NPCs with particular skills. Such construction may be administered by game item assembly program 116.

Information relating to player acquisitions of virtual resources may be stored by any means applicable. In one embodiment, such information is stored in player database 134. Player database 134 may include information such as, but not limited to, player ID, the character(s) controlled by the player, billing information, accounts length of time playing, and personal information. Player character database 136 may include information such as, but not limited to, character ID, player ID, assets, skills, obligations, and game environment access.

Some virtual resources may only become available at particular time points in the game. Information regarding the chronological progression of the game may be stored for example in current date database 122 or era database 130. Current date database 122 may be configured to track the passage of time and the virtual resources available at the particular point in the game play. Era database 130 may include information as Era ID, date range, and the skills, natural resources, raw materials and NPCs available in each era. Exchange multiplier database 132 may track the exchange ID number and the multiplier number for transactions between exchanges, game environments, game environment jurisdictions and/or games.

In one embodiment, each game environment is created with a certain number of points or other unit of value of available virtual resources. Such points may be a fixed amount for each environment, may be renewable, may be assigned randomly, may be based on an evaluation of the game environment owner character(s) or player(s) such as, the amount of wealth the player(s) and/or character(s) has accumulated, the amount of time the character(s) has been in existence or the player(s) behind the character(s) has played the game, assessments of the skill level of the character(s); the era of the game; game objectives; any other criteria relevant for assigning virtual resources, or a combination of the above. The type and quantity of virtual natural resources, raw materials, skills and NPCs available may be determined by the choices made regarding the allocation of those points. In one embodiment, a certain number of points may be available for virtual natural resources, raw materials, skills and NPCs. In another embodiment, there may be a pool of points or other unit of value that may be divided among virtual natural resources, raw materials, skills and NPCs. Within each category, each type of virtual resource may be worth a certain number of points for a particular quantity. For example, ten points may acquire 3 guns or 10 spools of thread or 5 tuna or 20 days of sunshine or 1 NPC with mining skills or 3 apprenticeships for weaving. During formation of the game environment, the points may be allocated to particular virtual resources with the number of points reflecting the amount of the virtual resource to be available in that environment based on the value of that virtual resource. The value of the virtual resource may be fixed or may be variable. For example, the value may fluctuate based on the demand for that virtual resource in the virtual game. In some embodiments, each game environment may select from the same amount of virtual resources at the same price. In another embodiment, there may be a finite amount of a virtual resource available for the game or a particular segment of the game and if it has been allocated in other game environments it may not be available for selection. In a further embodiment, the price or number of points a virtual resource is worth may increase as the availability declines. The price and amount available may be tied in whole or in part to real world exchanges, for example some virtual natural resources or raw materials may be tied to the availability or price of commodities on real world commodity exchanges such as, but not limited to, COMEX, Chicago Board of Trade, Chicago Mercantile Exchange, Euronext-.liffe, Kansas City Board of Trade, London Metal Exchange, Minneapolis Grain Exchange, New York Mercantile Exchange, New York Board of Trade, Intercontinental Exchange (ICE), Winnipeg Commodity Exchange, or to real world commodity indexes such as Dow Jones-AIG Commodity Index, Goldman Sachs Commodity Index, Reuters/Jefferies CRB Index, Rogers International Commodity Index, Standard & Poor's Commodity Index, NCDEX Commodity Index or the Deutsche Bank Liquid Commodity Index and/or any one or more of their virtual world counterparts or equivalents. In another embodiment, the price or value may be determined by the virtual world exchange rates, virtual world markets, virtual commodity exchanges or any combination of these. In yet another embodiment, the value may be set by the game environment, game server, game owner or other controlling authority, and/or via any applicable method, e.g., a statistical or genetic algorithm, neural net or other learning algorithm.

According to one embodiment, system 100 may be configured to allocate virtual resource points by performing the following steps:
1. Receive an indication that a game environment has been established.
2. Output game environment point configuration options (e.g. to the player(s)).
3. Receive a configuration based on options from entity that has established the game environment.
4. Store configuration.

In another embodiment, virtual resources may be purchased from other game environments or other games using currency, trade, barter or financing. Such purchases may be made by the owner(s) or controlling entities of a game environment, or by individual characters or groups of characters. In some embodiments, the ability to make such purchases may be enabled or disabled based upon current game play status, player attributes, one or more game objectives or goals or any combination thereof.

Attributes and virtual resources exchanged between game environments or game servers may be uniform or may be exchanged using multipliers to recognize differences between game environments. Conversion rates may be determined by any means applicable. They may be fixed, on an automated trading system, as determined by an exchange on the open market, or any combination thereof. For example, conversion rates may be based on a comparison of the economies of two game environments, a comparison of a representative basket of goods, the number of player characters in each environment, the attributes or characteristics of the player characters or game environments, the amount of a particular or group or type of virtual resource available in a particular game environment, the amount of production of a virtual resource, the price or relative value of a virtual resource in the game environments or on any other number of market forces or comparable factors. For example, a gallon of oil may be converted to two gallons of oil when traded from War Craft to Second Life. In another embodiment, a barrel of oil may be converted into 1000 thistle seeds within a game environment, and/or a barrel of oil may be converted to 5000 thistle seeds when exchanged between two games. 5000 thistle seeds may be worth 3 shares of stock in a particular game environment. In a further embodiment, a game attribute coming from a first environment may be converted into a game attribute in a second environment by multiplying the value of the game attribute in the first environment by a conversion multiplier that reflects the difference in the labor (and/or other factors) required to build or acquire the game attribute in the first environment vs. the second environment. For example, 1000 thistle seeds in one game environment may be worth 700 thistle seeds in another game environment. Alternatively or additionally, the multiplier may take into account any differences in supply, availability, ease or cost of acquisition, or the like, of the virtual resources and/or the prevailing exchange rates of real or virtual currency. Some game environments may be configured to produce items more optimally or have greater virtual resources. These game environments may receive a premium valuation in that their labor is more efficient or scarcer in that game environment than on other game servers. Alternatively, or in addition, environments that produce such items more optimally may be penalized or a tariff may be imposed to create a more fair exchange between or among such game environments.

In one embodiment, some or all of the following steps may be used to convert assets between game environments.
1. Generate a conversion value for two or more game environments based on activity and conditions in the game environments.
2. Create a conversion multiplier based on the relationship of the values between two or more game environments.
3. Store multiplier.

Such a multiplier could be calculated or stored using any means applicable, for example using exchange multiplier determination program 114.

In another embodiment, system 100 may be configured to determine the value of an item on an exchange based on a multiplier by performing the following steps:
1. Receive a request to purchase an item from a player character in one game environment.
2. Determine available items to fulfill the request that are owned by player characters in other game environments.
3. Retrieve the exchange multiplier between the game environments of the purchasing player and the selling players.
4. Multiply each available item by the appropriate exchange multiplier.
5. Output available items, with a corresponding price that has been adjusted based on exchange multipliers.
6. Receive a request to fulfill the request to purchase with one of the available items.
7. Withdraw virtual funds from the purchasing player character equal to the purchase price.
8. Convert the purchase price using the exchange multiplier into a virtual currency value.
9. Deposit virtual currency value into account of selling virtual player.

In another embodiment, the value of an item on an exchange may be determined by the entity that controls the exchange.

In a further embodiment, the value of an item on an exchange may be based on the fees paid to move an item from one virtual space to another. For example, in some embodiments, every game environment can trade with every other game environment. In other embodiments, there may be certain controls over which game environments can trade with each other. In those instances, a virtual resource may need to move through multiple exchanges in order to reach its final destination. Fees may be imposed by each exchange and item passes through, increasing the costs associated with a virtual resource.

According to one embodiment, the owner or manager of game server can set a minimum or maximum trade amount per time period on currency and other virtual resources both in the game environment and between game environments. Such settings can be accessed through a specified game server management GUI and application, may be created, determined, modified and/or maintained via automated means such as through the use of a statistical or genetic algorithm, neural net, or other learning algorithm, or may be set by clearing every transaction through the owner or manager or some combination thereof. This amount could be based on any one or more of, the total amount of a virtual resource available in a game parameter, the amount per player character of a virtual resource available in a game parameter, the amount of open buy orders for a virtual resource in a game environment, the amount of open sell orders for a virtual resource in a game environment, any other factors and/or rules and regulations as disclosed herein above. In one embodiment, the system could monitor the supply and demand for any given virtual resource or virtual resource type within and between games and game environments to ensure that there isn't an oversupply or undersupply. In one embodiment, oversupply could be defined as any supply that causes a game imbalance or might cause or prevent a game objective from being achieved as desired or expected, whether for one person, race, environment, entire game, multiple games, etc., or any other criteria established by the game or any governing body within the game. In another embodiment, there may be a minimum inventory of a virtual resource that must be maintained in a game environment. In a further embodiment, there may be a maximum inventory of a virtual resource that may exist in a game environment.

In some embodiments, import or export taxes may be imposed. Such taxes may be a percentage of the value of the import or based on the amount per unit of the import. They may be imposed by the game server, game owner, server owner, game environment owner(s), a character or group of characters, a duly authorized body including a third party, or any combination thereof. In some embodiments, there may be agreements between or among games and/or game environments, exchanges, or duly authorized third parties such as trade organizations, regarding import and export taxes. Taxes may be imposed to raise funds, reduce the level of imports, counter the practice of dumping, retaliate against trade barriers, retaliate against fraud, achieve or thwart game objectives, protect key industries, protect a new industry, or for any reason such taxes are generally imposed. Taxes may be manually or automatically adjusted based on taxes imposed by other servers and/or game environments or imposed unilaterally.

In some embodiments, once a virtual resource has been selected or acquired, it must be allocated within the game environment. In one embodiment, such allocation may be done automatically according to the rules of the game, game server, or game owner. In another embodiment, such an allocation may be done by the owner(s) or other controlling entities of the game environment. In some embodiments, allocation must adhere to certain physical rules, for example salt water fish are only found in salt water. In other embodiments, virtual resources may be placed according to whim, for example salt water fish are found in the leaves of silver oak trees during the waning moon.

According to one embodiment, system 100 may be configured to place virtual resources in virtual locations of the game environment by performing the following steps:
1. Receive a Resource Allocation Configuration from a Player Character.
2. Generate a Game Environment Map.
3. Receive a placement of resources on the game environment map.
4. Store placement of resources on game environment map.

In another embodiment, virtual resources may be allocated to each character in a game environment. Such an allocation may occur when a character is formed; when a character enters a game environment; each time a character enters a game environment; or at any other pre- or otherwise determined time point. In one embodiment, there may be a certain number of points allocated for virtual resources which may be distributed to characters until the points are used. In other embodiments, virtual resources may be allocated to some characters, may be allocated to all characters, may be distributed to characters in conjunction to placement in the environment, or any combination of the above.

In a further embodiment, virtual resources may be selected and placed in a game environment based on a vote. Such a vote may be taken among the members of the governing body or among the population at large. For example, a game environment may have a certain number of points for virtual resources allocation that have been held in reserve or otherwise acquired. The residents of the game environment may determine that they want more mineral deposits available in that game environment. If they vote on that issue and it succeeds, some of the points may be exchanged for mineral deposits. Votes may also be taken regarding the placement of the virtual resources within the environment.

In some embodiments, virtual resources may only become available if certain conditions are met. Such conditions may apply to a game environment as a whole or to a particular character, group of characters, or other entity. For example, certain virtual resources may only become available if certain skills are acquired, if a particular mission is completed, a certain amount of wealth is acquired, technological development has reached or should have reached a particular threshold, if the virtual resource is required to achieve a game objective, if a game environment reaches a particular age, if a particular population density is achieved, if a particular population threshold is reached, or any other criteria as determined by the game, game owner, game server or other intervening authority. For example, minerals may only appear if a character has the skills to extract those minerals. In another embodiment, iron ore will not become available if the game environment is in a Bronze Age, but will be available, for example, during or after the Iron Age.

According to one embodiment, system 100 may be configured to make a virtual resource available based on a game condition by performing the following steps:
1. Determine that a game condition has been satisfied in a game environment.
2. Determine if a resource is to be made available if the condition is satisfied.
3. Make resource available.

In another embodiment, virtual resources may be adjusted to further gameplay. For example, if characters fail to reach a level within a desired amount of time, the game may make certain skills or discoveries available without further player interaction in order to keep the game moving forward. This may be achieved, for example, using some or all of the following steps:
1. Monitor player activities.
2. Monitor resources.
3. Determine the status of one or more game objectives.
4. Determine if there is a need to change the availability of one or more resources and/or resource allocations, availability, pricing, tariffs, taxes, etc. given player and resources activities and game objectives.
5. Change resources as required.
6. Send communications to affected entities.

Once virtual resources are available in an environment, they may be acquired by residents of that environment. Virtual natural resources and raw materials may be found, harvested, gathered, mined, husbanded, grown, distilled, raised, leeched, pumped, drilled, purified or otherwise acquired from the game environment. In some embodiments, certain skills or tools may be needed in order to acquire certain virtual resources. For example, a certain amount of strength, or skills such as mining or fishing skills may be necessary in order to acquire a virtual natural resource. In another embodiment, anyone may acquire a virtual natural resource or raw material. Virtual resources may additionally be combined. For example, a player character may need to purchase or inherit a parcel of land, hire a real player or NPC farmer, and purchase seeds in order to grow and sell crops. Groups of game attributes can be combined with other groups in order to generate even greater up front or per turn wealth or to achieve a certain or group of game objectives. For instance a corn farm could be combined with a warehouse to store corn until it can be sold at the highest possible price.

According to another embodiment, a character or other entity may be required to apply for and/or buy a virtual permit in order to acquire virtual resources. Permits may apply to any acquisition of that virtual resource, to all virtual resources, or to the acquisition of a virtual resource in that particular game environment. The virtual permit may be a one-time fee and/or may require periodic payments that are fixed or variable, which may be based upon the total amount of the virtual resource available, the amount of the virtual resource that character has previously acquired, the number of characters or other entities applying for permits, the population density of a particular game environment, whether the virtual resource is renewable or non-renewable, vote by a group of player characters and/or an entity or player character elected to represent the player characters, the game manufacturer, by the game, market prices, or any combination of the foregoing.

According to one embodiment, game server 102 may be configured to perform some or all of the following steps:
1. Receive a request from a player character, group of player characters, or one or more third parties to acquire a permit.
2. Determine if there is an available permit for the virtual resource the player characters wish to acquire.
3. If there is an available permit determine and output a permit fee.
4. Receive an acceptance and payment for the permit fee.

Within a virtual environment, virtual natural resources and virtual raw materials are a function of the game. Their existence, allocation, availability, duration and sustainability may be determined by the game manufacturer, game server, game owner, server owner, genetic or other learning algorithm, character, group of characters, chance, an overseeing authority or any combination of the above. In some embodiments, certain skills or other attributes may be required in order to acquire virtual resources. In another embodiment, characters may only be able acquire a particular amount of virtual resources. Such determinations may be decided at random, based on the amount of virtual resources available, the number of characters in a particular environment, the skill level of a particular character, one or more game objectives, or any other criteria as governed by the rules of the game.

Figure 3:
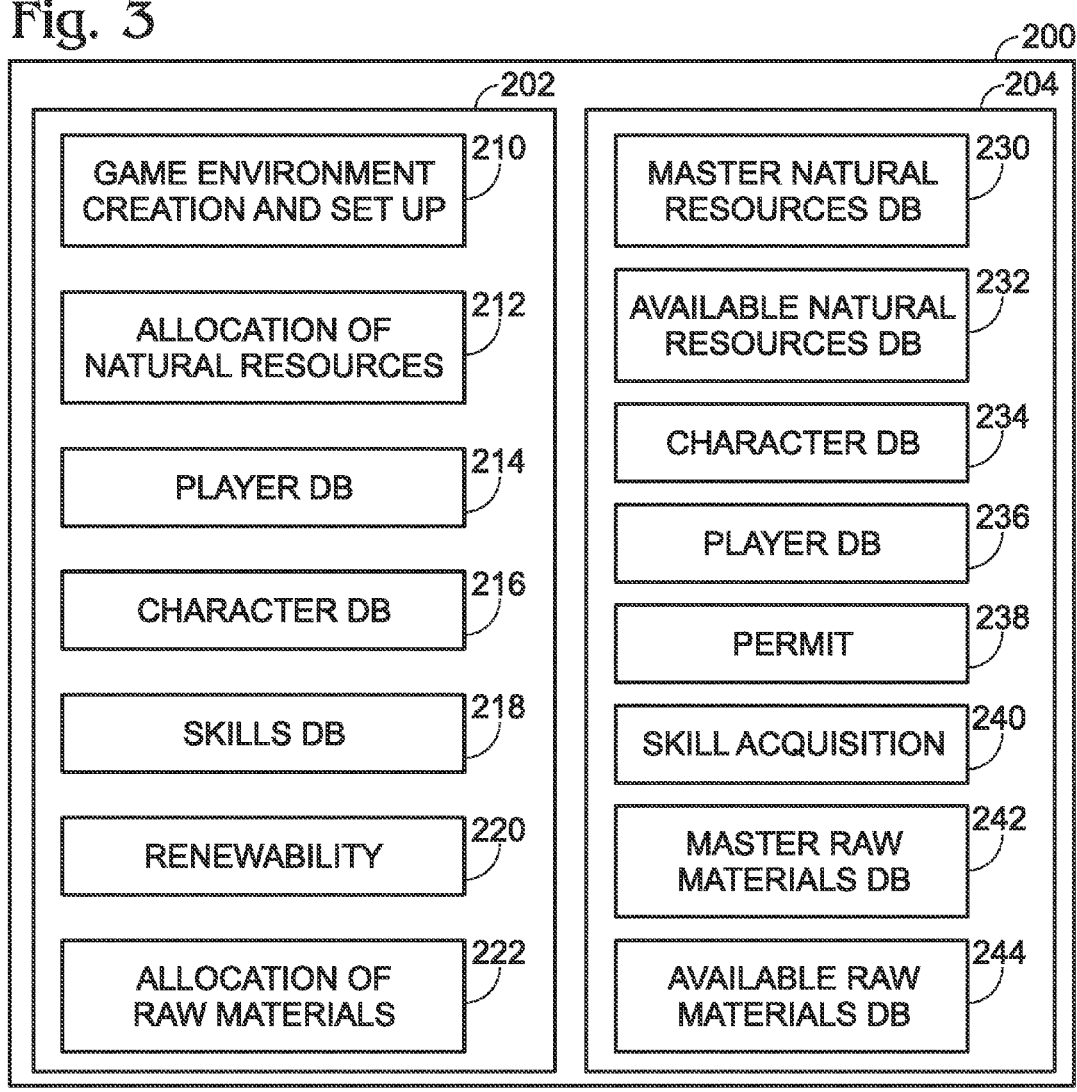
FIG. 3 is a block diagram depicting a system 200 according to an embodiment of the invention.

An exemplary system 200 configured to provide a virtual environment which permits the acquisition and use of virtual natural resources and virtual raw materials is shown in FIG. 3. As shown, system 200 includes a game server 202 and a natural resource management server 204. Game server 202 may include a game environment condition and set up program 210, an allocation of natural resources program 212, an allocation of natural resources program 212, a renewability program 220 and an allocation of raw materials program 222. Game server 202 may further include player database 214, character database 216 and skills database 218. Natural resources management server 204 may include programs such as skill acquisition program 240 and permit program 238 as well as master natural resources database 230, available natural resources database 232, character database 234, player database 236, master raw materials database 242 and raw materials available database 244.

Allocation of natural resources program 212 may, for example automatically distribute selected virtual natural resources, contain the rules or other regulations for allocating natural resources, or may be configured to allow the owner or governing entity of a game environment to distribute virtual natural resources as they desire.

Player database 214 may include information such as, but not limited to, player ID, the character(s) controlled by the player, billing information and personal information. Player character database 216 may include information such as, but not limited to, character ID, player ID, assets, skills, obligations, and game environment access.

Skill database 218 may contain information such as the skill ID, type, conditions for use, conditions for availability, maximum quantity allowed, maximum quantity issued, quantity remaining, license or permit fee, and available era(s).

Figure 5:
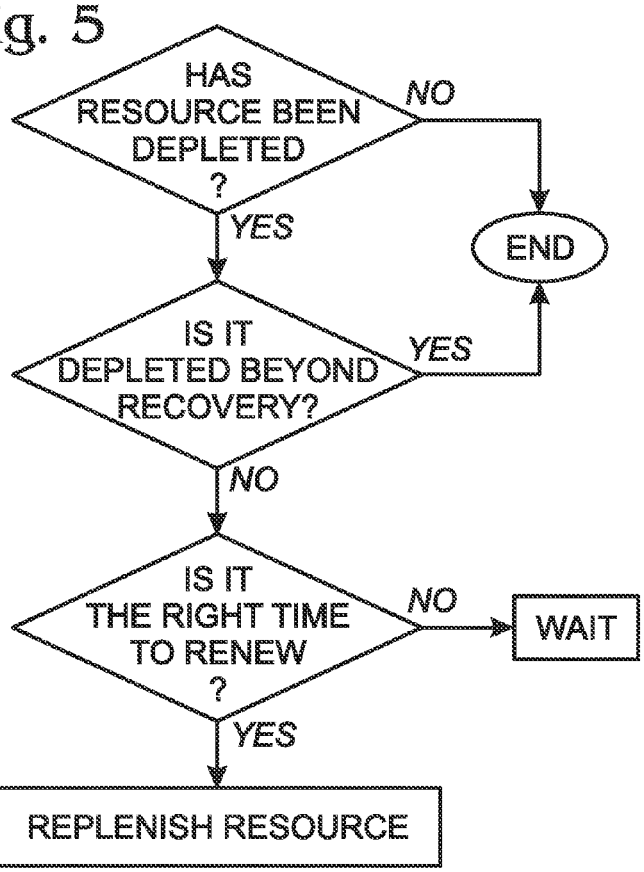
FIG. 5 is an embodiment of a method of renewing resources.

Renewability program 220 may be configured to determine if and when a resource is renewable, if there is a timing to the renewability, an amount that can be renewed, methods to determine if the virtual natural resource or virtual raw material has been over used, whether or not a resource is required by one or more game objectives, or any other similar criteria. For example, renewability program 220 may be configured to use some or all of the steps in FIG. 5 where a determination is made that a virtual resource has been depleted, whether it is depleted beyond recovery and the time of the renewal.

Allocation of raw materials program 222 may, for example, automatically distribute selected virtual raw materials, contain the rules or other regulations for allocating virtual raw materials, or may be configured to allow the owner or governing entity of a game environment to distribute virtual raw materials. In some embodiments, particular virtual raw materials may only appear when certain criteria are met such as mission completion, wealth accumulation, population density, time line, game objectives, etc. Allocation of raw materials program 222 may distribute these virtual raw materials when the required criteria are met.

Master natural resources database 230 may include, for example, a list of all virtual natural resources available in the game and/or the list of virtual natural resources selected in a particular game environment, the conditions for use, conditions for discovery, conditions for availability, maximum quantity allowed, quantity issued, quantity remaining, license or permit fee, perishability, and available eras.

Available natural resources database 232 may include, for example, all of the virtual natural resources that have been chosen or otherwise selected for a particular game environment, the virtual resources needed to obtain particular game objectives, the amount of each type of virtual natural resource remaining in that game environment, restrictions on imports or exports of virtual natural resources, taxes and duties for virtual natural resources, conditions for use, conditions for discovery, skills necessary for acquisition, conditions for availability, maximum quantity allowed in that game environment, quantity remaining, licenses or permits needed to acquire a natural resource, natural resource descriptor, natural resource ID, available date range, natural resource attributes 1-n, and renewability.

Player database 236 may include information such as, but not limited to, player ID, the character(s) controlled by the player, billing information and personal information. Player character database 235 may include information such as, but not limited to, character ID, player ID, assets including natural resources and raw materials, skills, permits, allowable virtual resource consumption limits and game environment access.

Virtual raw materials may include crude, processed, or partially processed material(s) that can be converted by manufacture, processing, or combination into a new and useful product. In one embodiment, virtual raw materials include semi-processed materials such as building supplies or food. Such conditions for virtual raw material may be established when the game environment is formed, or may evolve or be reassigned as the game environment develops. Master raw materials database 242 may include, for example, all raw materials which could potentially be allocated in a game environment, the amount of each raw material available in the game, raw material ID, raw material type, raw material attributes 1-n, renewability, natural decay rate/perishability, and quantity.

In one embodiment, available raw material database 244 may include, for example, the virtual raw materials that have been chosen and/or otherwise selected for a particular game environment, the amount of each type of virtual raw material remaining in that game environment, restrictions on imports or exports of virtual raw materials, conditions for use, conditions for discovery, skills necessary for acquisition, conditions for availability, maximum quantity allowed in that game environment, quantity remaining, licenses or permits needed to acquire or use virtual raw materials, virtual raw material ID, virtual raw material type, location, first date available, expiration date, natural decay rate/perishability factor, available times and renewability.

Figure 4:
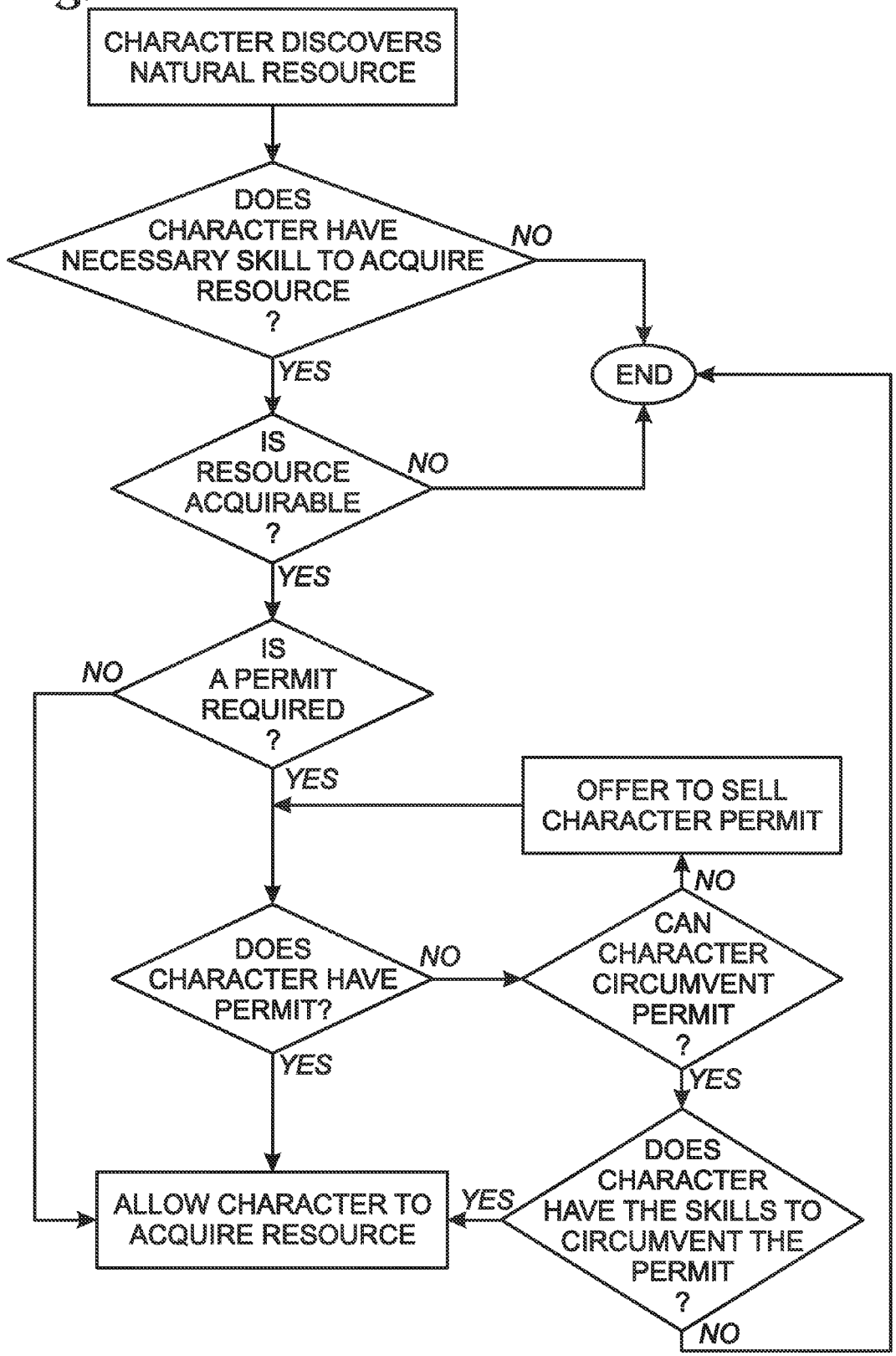
FIG. 4 is an embodiment of a method of acquiring natural resources.

Permit program 238 may include configurations for the need, use and issuing of permits. In one embodiment, during the formation of a game environment, or at any other applicable point, the type and amount of permits available may be determined. For example, it may be determined that only ten fishing permits may be issued, or it may be determined that an unlimited number of fishing permits may be issued but only to characters with the fishing skill set. The price of permits may be fixed or variable. The value may be fixed for the entire game or a particular segment of the game. In one embodiment, the value may fluctuate depending on the market, their desirability, and availability. In another embodiment, the value and/or availability may be determined based upon one or more game objectives or goals. In one embodiment permit program 238, for example, may be configured to calculate permit fees for characters, or may be configured to allocate permit and fee points within a game environment using some or all of the following steps:

1. Receive an indication that a player character has purchased a game environment.
2. Generate and output a configuration request for permits and fees in the game environment.
3. Receive and store a configuration for permits and fees in the game environment. In another embodiment, there may be skills such as poaching which allow a character to circumvent permit requirements. In such an embodiment, permit program 238 may follow some or all of the steps in FIG. 4 where the skills and permits required are verified.

In another embodiment, certain skills may be required in order to acquire virtual natural resources or raw materials. For example, some virtual natural resources or raw materials may be available to anyone who comes across them, for example certain wild plants may be harvested by anyone. Other virtual natural resources and raw materials may require particular skills to use, for example, building supplies may be available to anyone but only a character with building skills may be able to utilize them. In another embodiment, particular skills may be necessary in order acquire the virtual natural resources or raw materials. For example, fishing skills may be required in order to fish, or a particular spell may be needed to extract ores. In order to determine if the character has the necessary skills, some or all of the steps in FIG. 4 may be followed to verify that the character has the skills necessary. In a further embodiment, there may be ways to circumvent the requirement for particular skills. For example, an NPC could have the necessary skills even if the character who finds or has control of the virtual natural resources or raw materials does not.

In the same way that virtual natural resources and raw materials are selected and placed in a game environment, skills may be selected and placed in a game environment. Any skills may be available in a game environment, or the types of skills and the number of characters who have those skills may be predetermined wherein every game environment starts with the same amount of skills available. In another embodiment, the availability of skills or particular types of skills may be distributed according to any relevant criteria including, but not limited to, randomly; as determined by the game sever or other game parameters; as determined by the game owner; as determined by the game environment owner; according to an evaluation of the game environment owner character(s) or player(s) such as, the amount of wealth the player(s) and/or character(s) has accumulated, the amount of time the character(s) has been in existence or the player(s) behind the character(s) has played the game; the era of the game; the previous skills the character has acquired; game objectives; opportunities within the game environment; any other criteria relevant for assigning virtual resources; or a combination of the above. In one embodiment, additional skills may be purchased for allocation within the game environment. In a further embodiment, the game server, game owner, or other governing entity may add skills that were not originally part of the game environment or remove skills that were. In another embodiment, each game environment may have a certain number of skill points that can be attributed to server or player defined trades. In this manner, player characters on one game server can become expert in certain types of trades up to the total skill level specified by the settings of that game environment or server and/or another server with which they may interact. In a further embodiment, players receive such points or additional points if such player assists one or more other players to learn a skill or perform other services. In yet another embodiment, players may be permitted to purchase some or all of the points needed to acquire one or more virtual skills. In another embodiment, some skills may have continuing education requirements or use it or lose it provisions in which the skill must be used periodically or it will atrophy and/or disappear.

Figure 6:
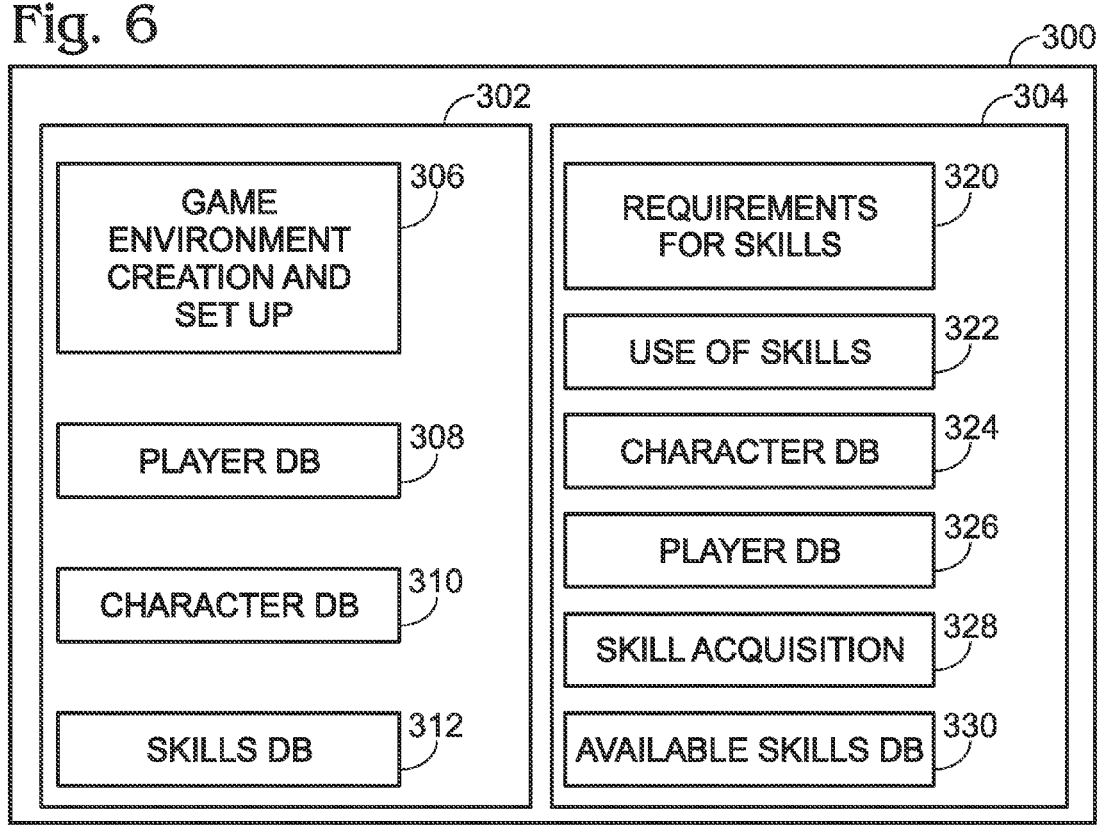
FIG. 6 is a block diagram depicting a system 300 according to an embodiment of the invention.

An exemplary system 300 configured to provide a virtual environment which permits the acquisition and use of skills is shown in FIG. 6. As shown, system 300 includes a master game server 302 and a master skills server 304. Master game server 302 may include game environment creation and set up program 306 and databases such as player database 308, character database 310, and skills database 312. Master skills server 304 may include programs such as requirements for skills 320, use of skills 322 and skill acquisition 328 as well as databases such as character database 324, player database 326 and available skills database 330.

Game environment creation and set up program 306 may determine the number and type of skills available to be accessed in a game environment. In another embodiment, game environment creation and set up program 306 may provide the space in which skills may be placed. In a further embodiment, set up program 306, determines the number and type of skills available based upon one or more initial or subsequent game objectives or goals.

Player database 308 may include such information as player ID, characters 1-n, billing information, personal information, account type, and assets. Character database 310 may include information such as character ID, player ID, assets, debts and skills.

Requirements for skills program 320 may evaluate characters to determine if they qualify for skills. For example, certain skills may have prerequisites such as a requirement that an apprenticeship has been served or that a journeyman level is obtained before a master level. Other skills may require that the game environment has reached or should have reached a particular point in development or that a character has obtained a particular level of wealth. In a further embodiment, certain skills may only be available to certain types of characters or limited to a certain number of characters. Requirements for skills program 320 may use some or all of the following steps to determine if the requirement has been met:
1. Character discovers or seeks to acquire skill.
2. Verify that any prerequisites have been met.
3. If prerequisites have been met, award skill to character.

Skill acquisition program 320 may include means for acquiring skills, for example apprenticeship programs, education programs, training programs, schools, etc. Some skills may have multi-step processes towards acquiring skills so that as each level is completed, a character may acquire a part of a skill until the entire skill is obtained. For example, as part of an apprenticeship program in order to obtain a journeyman ranking, three skills must be acquired. A character may acquire one or more skills at the same time, but does not need to acquire all three skills at the same time. Skill acquisition program 320 may also provide opportunities for skills to be acquired such as through the establishment of programs such as apprenticeships or through the establishment of the criteria that need to be met in order to acquire a skill. Skills may optionally be introduced or expanded through education. If certain skills are in high demand, players may choose to pay for an education to obtain these skills. Skills may also be acquired by any one or more of the following including by chance, purchased, learned, stolen, inherited, won, acquired through gameplay, i.e. achieving a certain level, winning a conflict, war, battle, eating your opponent, casting a spell, solving a puzzle, etc. In another embodiment, a player may bypass the need to learn one skill that is customarily or generally required to learn a higher skill. For example, a player may be granted a skill without learning any prerequisites if such player serves as a tutor for new players. In another embodiment, there may be "cheating" skills which may allow you to bypass prerequisites for other skills.

When, how, and with what effectiveness skills may be used may be determined by any means applicable, for example through use of skills program 322. In some embodiments, certain tools or other assets may be required in order to use a skill. In another embodiment, a particular amount of a character attribute such as strength or energy may be required, for example if the character is low on energy, the skill may be less effective.

Player database 326 may include such information, for example as player ID, characters 1-n, billing information, personal information, account information, assets, length of time playing the game, previous characters etc. Character database 324 may include information such as character ID, character type, player ID, Assets 1-n, skills 1-n, debts, obligations 1-n, progress towards skills, inventory, virtual natural resources, and virtual raw materials.

The availability of particular skills for acquisition may be stored by any means applicable, for example in availability of skills database 330. Such a database may include all skills available within a game and/or the skills available within a particular game environment. Skills database 330 may further include information regarding skill ID, type, conditions for use, conditions for availability, maximum quantity allowed, quantity issued, quantity remaining, license or permit fee and available era(s).

In one embodiment, each game environment is created with a certain number of points or other unit of value of available skills. Such points may be a fixed or variable amount for each environment, may be renewable, may be assigned randomly, may be based on a game objective, may be based on an evaluation of the game environment owner character(s) or player(s) such as, the amount of wealth the player(s) and/or character(s) has accumulated, the amount of time the character(s) has been in existence or the player(s) behind the character(s) has played the game, assessments of the skill level of the character(s); any other criteria relevant for assigning skills; or a combination of the above. The type and quantity of skills available may be determined by the choices made regarding the allocation of those points. For example, each type of skill may be worth a certain number of points. During formation of the game environment, the points may be allocated to particular skills that may be acquired in that game environment with the number of points reflecting the number of characters that may acquire that skill in that environment or the value of that skill. The value of the skill may be fixed or may be variable. For example, the value may fluctuate based on the demand for that skill in the virtual game. In some embodiments, each game environment may select from the same skills at the same price. In another embodiment, there may be a finite amount of skills available for the game or a particular segment of the game and if it has been allocated in other game environments it may not be available for selection. In a further embodiment, the players create or invent the skills themselves and may also establish the rules for use of such skills. In yet another embodiment, the price or number of points a skill is worth may increase or change as the availability declines. The price and amount available may be tied, in whole or in part, to real or virtual world evaluations, for example indexes of job growth or evaluations of areas in which more people are needed.

According to one embodiment, system 300 may be configured to allocate skill points by performing the following steps:
1. Receive an indication that a game environment has been established.
2. Output game environment skill configuration options (e.g. to the player(s)).
3. Receive a configuration based on options from entity that has established the game environment.
4. Store configuration.

In another embodiment, skills may be purchased from other game environments or other games or character with particular skills may be recruited. Such purchases and recruitment efforts may be made by the owner(s) or controlling entities of a game environment, or by individual characters or groups of characters. In some embodiments, the ability to make such purchases may be enabled or disabled based upon current game play status, player attributes, one or more game objectives or goals or any combination thereof.

According to one embodiment, the game server can set a maximum trade amount per time period on skills or characters both in the game environment and between game environments. This amount could be based on any one or more of, the total amount of a skill available in a game parameter, the amount of open buy orders for a skill in a game environment, the amount of open sell orders for a skill in a game environment, the amount of put or call orders, objective, goals, and/or any other factors and/or rules and regulations as disclosed herein above. In one embodiment, the system could monitor the supply and demand for any given skill. There may also be limits at some or all points of play on the types of skills that may be brought into a game environment, for example skills to make gas powered motors may not be brought into a pre-industrialized era game environment.

In some embodiments, skills may only become available if certain conditions are met. Such conditions may apply to a game environment as a whole or to a particular character, group of characters, or other entity. For example, certain skills may only become available if certain virtual resources are acquired, if a prerequisite skill has been acquired, if a particular mission is completed, a certain amount of wealth is acquired, a certain game goal or objective is desired, technological development has reached a particular threshold, if a game environment reaches a particular age, if a particular population density is achieved, or any other criteria as determined by the game, game owner, game server or other intervening authority. For example, the skill to make steel will not become available if the game environment is in a bronze age.

According to one embodiment, system 300 may be configured to make a skill available based on a game condition by performing the following steps:

1. Determine that a game condition has been satisfied in a game environment.
2. Determine if a skill is to be made available if the condition is satisfied.
3. Make skill available.

According to another embodiment, skills may be made available in order to achieve particular goals or objectives. For example, system 300 may be configured to make a skill available based on a game objective or goal by performing some or all of the following steps:

1. Determine that a game objective has been or should be achieved in a game environment.
2. Determine if a skill is to be made available if the required by the objective or goal
3. Make skill available.

According to another embodiment, a character or other entity may be required to apply for and/or buy a virtual permit in order to use a skill. The virtual permit may be a one-time fee and/or may require periodic payments that are fixed or variable, which may be based upon the total number of characters that have that skill, the number of times the character has previously used that skill, the number of characters or other entities applying for permits, the population density of a particular game environment, vote by a group of player characters and/or an entity or player character elected to represent the player characters, the game manufacturer, by the game, market prices, game objectives, or any combination of the foregoing.

According to one embodiment, game server 302 may be configured to perform some or all of the following steps:

1. Receive a request from a player character, group of player characters, or one or more third parties to acquire a permit.
2. Determine if there is an available permit for the skill the player characters wish to use.
3. If there is an available permit determine and output a permit fee.
4. Receive an acceptance and payment for the permit fee.

Even with the necessary skills, characters may require assistance in acquiring virtual natural resources or raw materials and/or using the virtual natural resources or raw materials. Characters may act alone or together to accumulate virtual resources and raw materials or otherwise amass wealth. In one embodiment, NPCs may also be acquired, bought and sold in and between game environments and games and used to assist a character or characters to acquire virtual resources or raw materials. NPCs may have skills of their own, may be simple laboring entities and/or may be trainable in that they may acquire skills or further education. Each game server or game environment can have a fixed or variable number of NPCs. In one embodiment, the number and skill levels of NPCs may be predetermined wherein every game environment starts with the same number or the same skill sets. In another embodiment, the availability of NPCs or NPCs with particular skills may be determined according to any relevant criteria including, but not limited to, randomly; as determined by the game sever or other game parameters; as determined by the game owner; as determined by the game environment owner; according to an evaluation of the game environment owner character(s) or player(s) such as, the amount of wealth the player(s) and/or character(s) has accumulated, the amount of time the character(s) has been in existence or the player(s) behind the character(s) has played the game; the era of the game; opportunities within the game environment; game objectives; any other criteria relevant for assigning NPCs; or a combination of the above. In one embodiment, additional NPCs may be purchased for availability within the game environment. In a further embodiment, the game server, game owner, or other governing entity may add NPCs or particular skill sets to NPCs that were not originally part of the game environment or remove NPCs that become obsolete.

Figure 7:
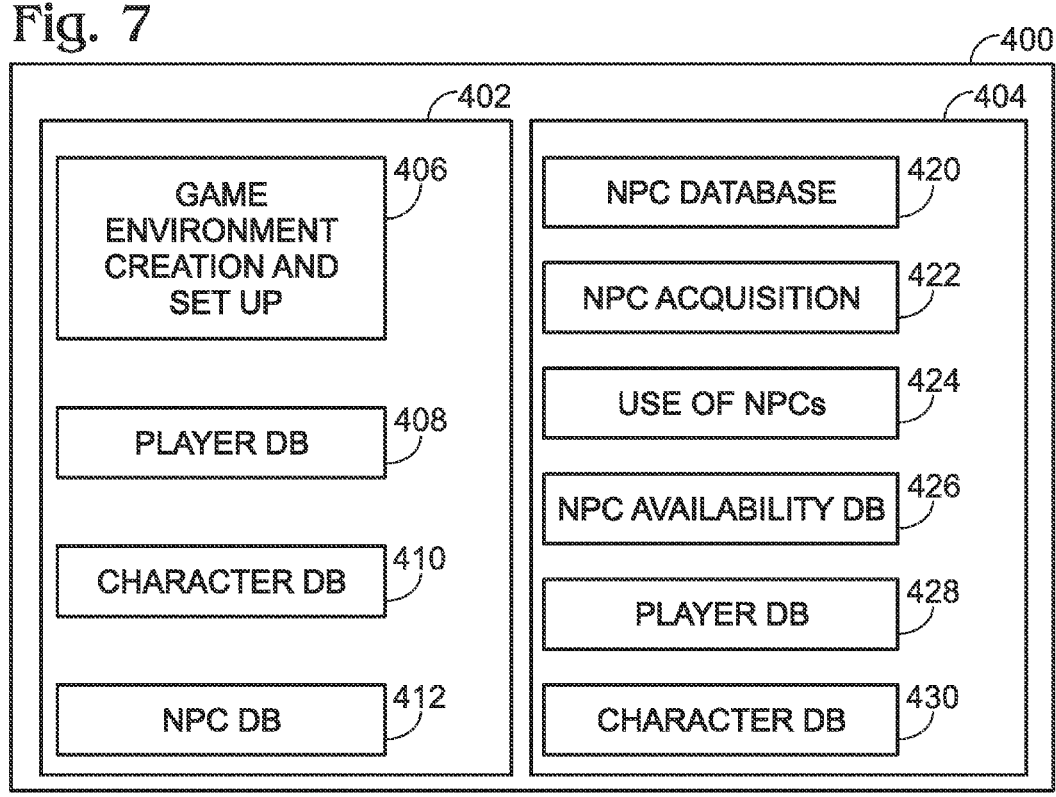
FIG. 7 is a block diagram depicting a system 400 according to an embodiment of the invention.
Figure 8:
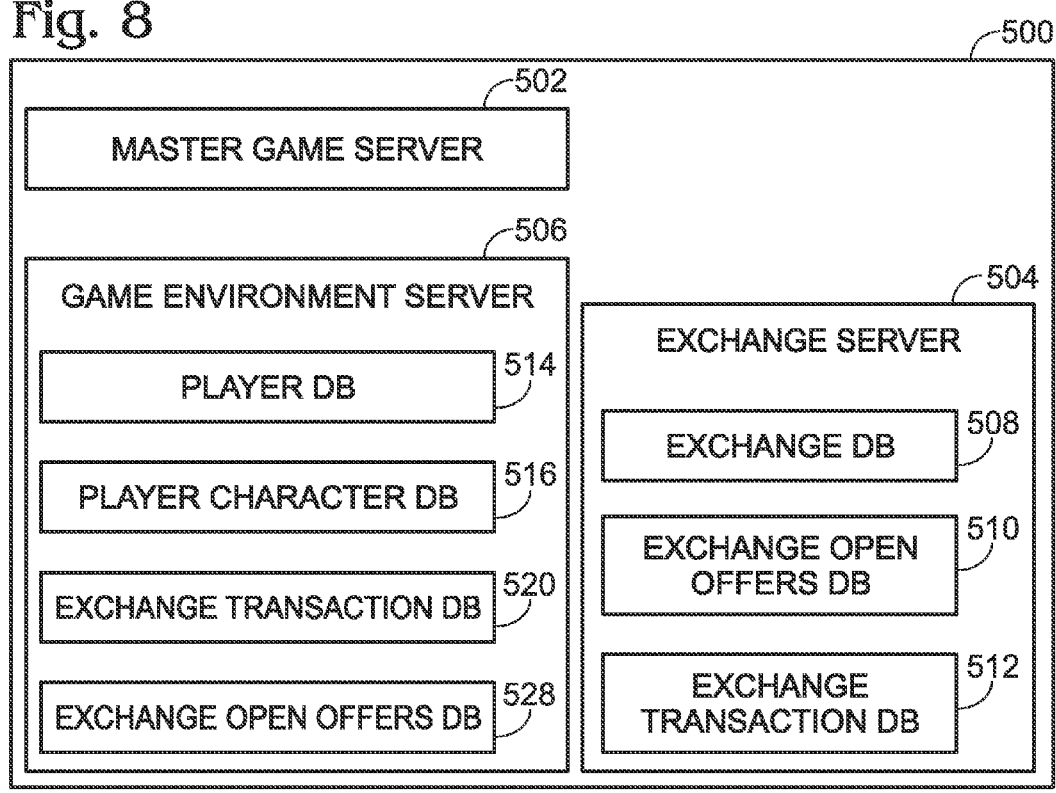
FIG. 8 is a block diagram depicting a system 500 according to an embodiment of the invention.

An exemplary system 400 configured to provide and regulate NPCs is shown in FIG. 7. As shown, system 400 includes a master game server 402 and a master NPC server 404. Master game server 402 may include such things as a game environment creation and set up program 406, and databases such as player database 408, character database 410, and NPC database 412. Master NPC server 404 may include an NPC database 420, NPC acquisition program 422, use of NPCs program 424, NPC availability DB 426, player database 428 and character database 430.

Game environment creation and set up program 306 may determine the number and type of skills available to be accessed in a game environment. In another embodiment, game environment creation and set up program 306 may provide the space in which NPCs may be placed.

Player database 408 may include such information as player ID, characters 1-n, billing information, personal information, account type, and assets. Character database 410 may include information such as character ID, player ID, assets, debts and skills.

NPC database 412 may include information such as NPC ID, type, location, conditions for use, conditions for availability, maximum quantity allowed, quantity issued, quantity remaining, license or permit fee and available eras.

NPC acquisition program 420 may include means for acquiring, hiring, employing, defeating, destroying, conning, absorbing, eating, learning from, or purchasing NPCs. NPCs may be assigned, hired, discovered, captured, charmed, conned, eaten, absorbed, destroyed, controlled, or otherwise acquired using any suitable means.

When, how, and with what effectiveness skills or other virtual resources may be used may be determined by any means applicable, for example through use of NPCs program 424. In some embodiments, NPCs may be able to do almost anything. In another embodiment, NPCs may be issued with particular skills or other virtual resources or may acquire certain skills or other virtual resources. In a further embodiment, certain types of NPCs may have certain abilities, levels of strength, recuperation, or any other attribute with which an NPC may be supplied. In another embodiment, other entities may be able to obtain the skills or other virtual resources of the NPC by stealing them, acquiring an NPC, killing an NPC, taking over an NPC's body, eating an NPC, defeating an NPC, hypnotizing an NPC, casting a spell, conning an NPC, befriending an NPC, learning from an NPC, paying an NPC, or any combination thereof.

The availability of particular NPCs for acquisition may be stored by any means applicable, for example in availability of NPCs database 426. Such a database may include all NPCs available within a game and/or the skills available within a particular game environment. Available NPC database 426 may further include information regarding NPC ID, type, ability, conditions for use, conditions for availability, character ID, maximum quantity allowed, quantity issued, quantity remaining, license or permit fee, valuation, equivalents and available eras. In one embodiment, NPCs may be capable of being upgraded or combined to achieve other NPCs, for example two spearmen may be traded or combined for one swordsman or two spearmen and a swordsman may be traded or combined to make or in exchange for a knight.

Player database 326 may include such information, for example as player ID, characters 1-n, billing information, personal information, account information, assets, length of time playing the game, previous characters etc. Character database 324 may include information such as character ID, character type, player ID, Assets 1-n, skills 1-n, debts, obligations 1-n, progress towards skills, inventory, virtual natural resources, and virtual raw materials.

In one embodiment, each game environment is created with a certain number of points or other unit of value of available NPCs. Such points may be a fixed amount for each environment, may be renewable, may be assigned randomly, may be based on an evaluation of the game environment owner character(s) or player(s) such as, the amount of wealth the player(s) and/or character(s) has accumulated, the amount of time the character(s) has been in existence or the player(s) behind the character(s) has played the game, assessments of the skill level of the character(s); any game objective or goal; any other criteria relevant for assigning skills; or a combination of the above. In one embodiment, a game environment may be assigned a total number of points or a particular value which may be divided among virtual natural resources, raw materials, skills and NPCs according to the desire of the creator. The type and quantity of NPCs and the attributes of the NPCs available may be determined by the choices made regarding the allocation of those points. For example, each type of NPC may be worth a certain number of points. During or subsequent to the formation of the game environment, the points may be allocated to particular NPCs that may be acquired in that game environment with the number of points reflecting the number of NPCs of that type available or the value of that NPC. The value of the NPC may be fixed or may be variable. For example, the value may fluctuate based on the demand for that type of NPC in the virtual game. In some embodiments, each game environment may select from the same types of NPCs at the same price. In another embodiment, there may be a finite amount of NPCs available for the game or a particular segment of the game and if it has been allocated in other game environments it may not be available for selection. In a further embodiment, the price or number of points a NPC is worth may increase as the availability declines. In another embodiment, the number and availability, price, skill set, virtual resources, or any combination thereof of any one or more NPC may be partially or entirely affected by the current, anticipated or desired state of the game; the need or desire by any one or more of the game owner, server owner, players, player characters, exchanges, or any interested entity or third party, regarding or relating to any one or more game objective or goal as determined by any of the preceding parties and/or as further defined herein; as determined over time within the game itself based upon one or more rules and/or as learned by a learning algorithm (e.g., a neural net or genetic algorithm) and/or statistical model; by influences of outside applications or sources such as a stock or other exchange; third party application or other games; or any combination thereof.

According to one embodiment, system 400 may be configured to allocate NPC points by performing the following steps:

1. Receive an indication that a game environment has been established.
2. Output game environment point configuration options (e.g. to the player(s)).
3. Receive a configuration based on options from entity that has established the game environment.
4. Store Configuration.

In another embodiment, NPCs may be purchased or acquired from other game environments or other games. Such purchases may be made or controlled by the owner(s) or controlling entities of a game environment, or by individual characters or groups of characters. In some embodiments, the ability to make such purchases may be enabled or disabled based upon current game play status, player attributes, one or more game objectives or goals or any combination thereof.

According to one embodiment, the game server can set a maximum trade amount per time period NPCs both in the game environment and between game environments. This amount could be based on any one or more of, the total number of NPCs available in a game parameter, the amount of open buy orders for a type of NPC in a game environment, the amount of open sell orders for a type of NPC in a game environment, any other factors and/or rules and regulations as otherwise disclosed herein above. In one embodiment, the system could monitor the supply and demand for any given NPC.

In some embodiments, some types of NPCs may only become available if certain conditions are met. Such conditions may apply to a game environment as a whole or to an era, time frame, a particular character, group of characters, type or class of characters, or other entity of any combination thereof. For example, certain NPCs may only become available if certain virtual resources are acquired, if a prerequisite skill has been acquired, if a particular mission is completed, a certain amount of wealth is acquired, technological development has reached a particular threshold, if a game environment reaches a particular age, if a particular population density is achieved, or any other criteria as determined by the game, game owner, game server or other intervening authority. For example, NPCs may have hidden abilities that are only unlocked if a particular puzzle is solved by the controller of the NPC. As another example, NPCs with sword making abilities may only be available in environments that use swords.

According to one embodiment, system 400 may be configured to make a NPC or the skills of an NPC available based on a game condition by performing the following steps:

1. Determine that a game condition has been satisfied in a game environment.

2. Determine if a NPC is to be made available if the condition is satisfied.
3. Make NPC available.

In another embodiment, system 400 may be configured to make a NPC or the skills of an NPC available based upon one or more game objectives or goals by performing the following steps:
1. Determine that a game objective or goal is desired in a game environment.
2. Determine if the objective or goal can be achieved by making such NPC available.
3. Make NPC available.

In one embodiment, virtual natural resources, raw materials, skills, NPCs, permits, points for raw materials, points for virtual natural resources, points for skills and points for NPCs may be sold or traded on a virtual exchange. Such an exchange is further described in detail in U.S. patent application Ser. Nos. 11/428,263, filed Jun. 30, 2006, and Ser. No. 11/560,456, filed Nov. 16, 2006, each of which is herein incorporated by reference in its entirety. An embodiment of an exchange system is shown in FIG. 7. As shown, system 500 includes a master game server 502 a game environment server 506 and an exchange server 504.

Game environment server 506 may include databases such as player database 514, player character database 516, exchange open offers database 528, exchange transaction database 520.

In one embodiment, Player Database 514 may include information such as, but not limited to player ID, player billing info, player personal info, player credit info, and player assets. Player Character Database 516 may include information such as, but not limited to, character ID, player ID, character assets, character inventory, character Skills, virtual account numbers, character permits, NPC employment.

Exchange Server 504 may include or host various programs, routines, subroutines and/or databases including, but not limited to an exchange database 508, an exchange open offers database 510, and an exchange transaction database 512.

In one embodiment, Exchange database 508 may include information such as, but not limited to, exchange ID, exchange type, allowable assets, and allowed traders. Exchange open offers database 510 could contain information such as:
1. Offer ID
2. Offer type
3. Offer posting date
4. Offer expiration date
5. Offer Item
6. Offer Quantity
7. Offer Price.

Exchange open offers may additionally be associated with the character or player submitting the offer. Such information could be stored in Exchange Open Offer Database 528 and include information such as the character ID, holdings, offer ID, offer type, offer posting date, offer expiration date, offer item, offer quantity, and offer price.

In one embodiment, each transaction could be stored in an Exchange Transaction Database, for example in Exchange Transaction Database 512. Such a database could store information such as:
1. Order ID
2. Order Buyer
3. Order Seller
4. Order Date
5. Order Price
6. Order Type
7. Order terms and conditions In another embodiment, such transactions could be associated with the character in Exchange Transaction Database 520. Such a database could include information such as character ID, character inventory, order ID, order date, order, price, order type, and/or authentication number.

According to one embodiment, the game server can set a minimum and maximum trade amount per time period on currency and other virtual resources both in the game environment and between game environments. This amount could be based on any one or more of: the total amount of a virtual resource available in a game parameter; the amount per player character of a virtual resource available in a game parameter; the amount of open buy orders for a virtual resource in a game environment; the amount of open sell orders for a virtual resource in a game environment; any other factors and/or rules and regulations as disclosed herein above. In another embodiment, there may be permits required or import and export taxes imposed on items exchanged between game environments or between games. Such calculations may be made, for example, using some or all of the following steps:
1. Receive a request to sell a virtual item on an exchange.
2. Determine if item is unique.
3. Determine if a permit exists to sell the item.
4. If the item is unique and a permit exists, post item on exchange.
5. Receive acceptance of request.
6. Determine an import tax amount and an export tax amount.
7. Apply import tax amount to purchase price.
8. Withdraw virtual cash equal to purchase price plus tax from buyer.
9. Transmit purchase price, less applicable export tax fees to seller.

Items bought and sold on the exchange may generate virtual currency, and/or real currency and/or may generate an exchange of assets. The value of a currency or an asset may be based on a conversion factor as described above or on an exchange rate.

The exchange rate for one type of virtual currency for another type of virtual currency, virtual currency for real currency, virtual assets for real assets, real assets for virtual assets, real assets for virtual currency, virtual assets for real currency or virtual assets for virtual currency (or any combination of these) may be fixed in that the rate does not change for the duration of the game or segment of the game. Alternatively, the exchange or conversion rate may be variable. Such a variable rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency, or the relative demand of particular types of virtual currency, or based upon the affect of said rates on one or more game objectives or goals. Said exchange rates may further be established or determined by any suitable method including, but not limited to, by a) the game manufacturer, b) the owner(s) of the server(s) upon which the game resides, c) one or more player characters, d) market forces, e) law or regulation of the game or within the real world, f) negotiation among the affected parties, g) game objectives, or h) any combination of the above.

It will be appreciated that while, for the sake of discussion, various databases have been described separately, the data in these and any other suitable databases could be merged into a single large databases and/or maintained separately in additional databases, or in other structures besides a database. Moreover, any such databases could be independent or linked, and the data in these databases could be stored centrally on a server or separately on game devices.

The present disclosure provides numerous systems and methods related to virtual environments in online computer games. It should be appreciated that numerous embodiments are described in detail and that various combinations and subcombinations of these embodiments are contemplated by the present disclosure.

CONCLUSION

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications as are reflected in the range of real world financial institutions, instruments and activities. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. §1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. In certain embodiments, communications may be made in the form of an alert.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

I claim:

1. A method performed by a computing device, the method comprising:

running, by a Video Game Central Server, a massive multi player online game that is operable to simultaneously support a plurality of players via a plurality of video game devices, in which each of the players controls at least one player character, in which play of the game continues regardless of whether a first player character of the plurality of player characters is logged in to the game;

in which a first game environment is provided to the first player character;

acquiring, by the Video Game Central Server, virtual resources from a second game environment through a virtual exchange, based on a conversion rate between the first game environment and the second game environment, wherein the first game environment and the second game environment exist in different games;

determining, by the Video Game Central Server, a value in the first game environment of the virtual resources from the second game environment; and permitting, by the Video Game Central Server, the first player character to select an amount of virtual resources for distribution within the game environment wherein the resources available for selection depends on a game objective.

2. The method of claim 1, wherein the first player character comprises multiple characters, multiple players, a character, a player, a NPC, multiple NPCs, a company, a religion, a committee, or a governing body.

3. The method of claim 1, wherein the virtual resources are selected from the group consisting of natural resources, raw materials, skills, and NPCs.

4. The method of claim 1, wherein the first player character may add to available resources in a game environment during gameplay in order to advance a game objective.

5. The method of claim 1, wherein the amount of virtual resources available may alter depending on the value of the virtual resources.

6. The method of claim 5, wherein the value of the virtual resources is dependent on a game objective.

7. The method of claim 1, wherein the virtual resources are renewable.

8. The method of claim 1, further comprising placing, by the Video Game Central Server, the virtual resources within the virtual environment, wherein the placement of the virtual resources by the first player character is based on game objectives.

9. The method of claim 8, wherein the placement of virtual resources must adhere to real world physical laws.

10. The method of claim 8, wherein the placement of virtual resources must adhere to virtual world physical laws.

11. The method of claim 8, wherein the placement of virtual resources may be made regardless of physical laws.

12. The method of claim 8, wherein access to virtual resources in the game environment depends on game objectives.

13. The method of claim 8, wherein a character must have certain skills in order to access the placed virtual resources.

14. The method of claim 8, wherein a character must have a permit in order to access the placed virtual resources.

15. The method of claim 8, wherein the placed virtual resources are only available if certain conditions are met.

16. An apparatus comprising:

a processor; and a computer readable medium in communication with the processor;

in which the computer readable medium stores instructions which, when executed by the processor, direct the processor to perform a method that includes:

running a massive multi player online game that is operable to simultaneously support a plurality of players via a plurality of video game devices, in which each of the players controls at least one player character, in which play of the game continues regardless of whether a first player character of the plurality of player characters is logged in to the game;

in which a first game environment is provided to the a first player character;

acquiring virtual resources from a second game environment through a virtual exchange, based on a conversion rate between the first game environment and the second game environment, wherein the first game environment and the second game environment exist in different games;

determining a value in the first game environment of the virtual resources from the second game environment; and permitting the first player character to select an amount of virtual resources for distribution within the game environment wherein the resources available for selection depends on a game objective.

* * * * *